Patented July 18, 1950

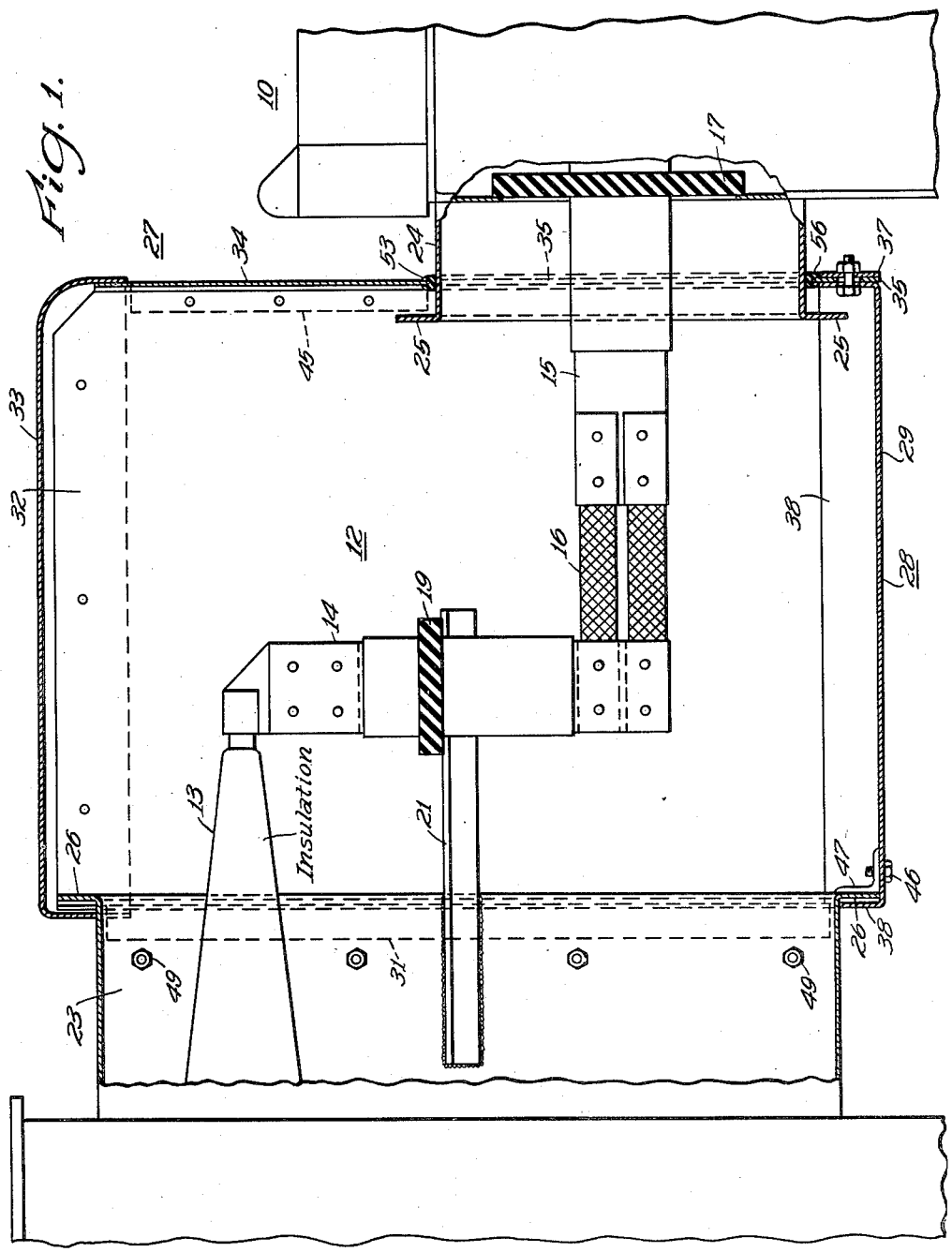

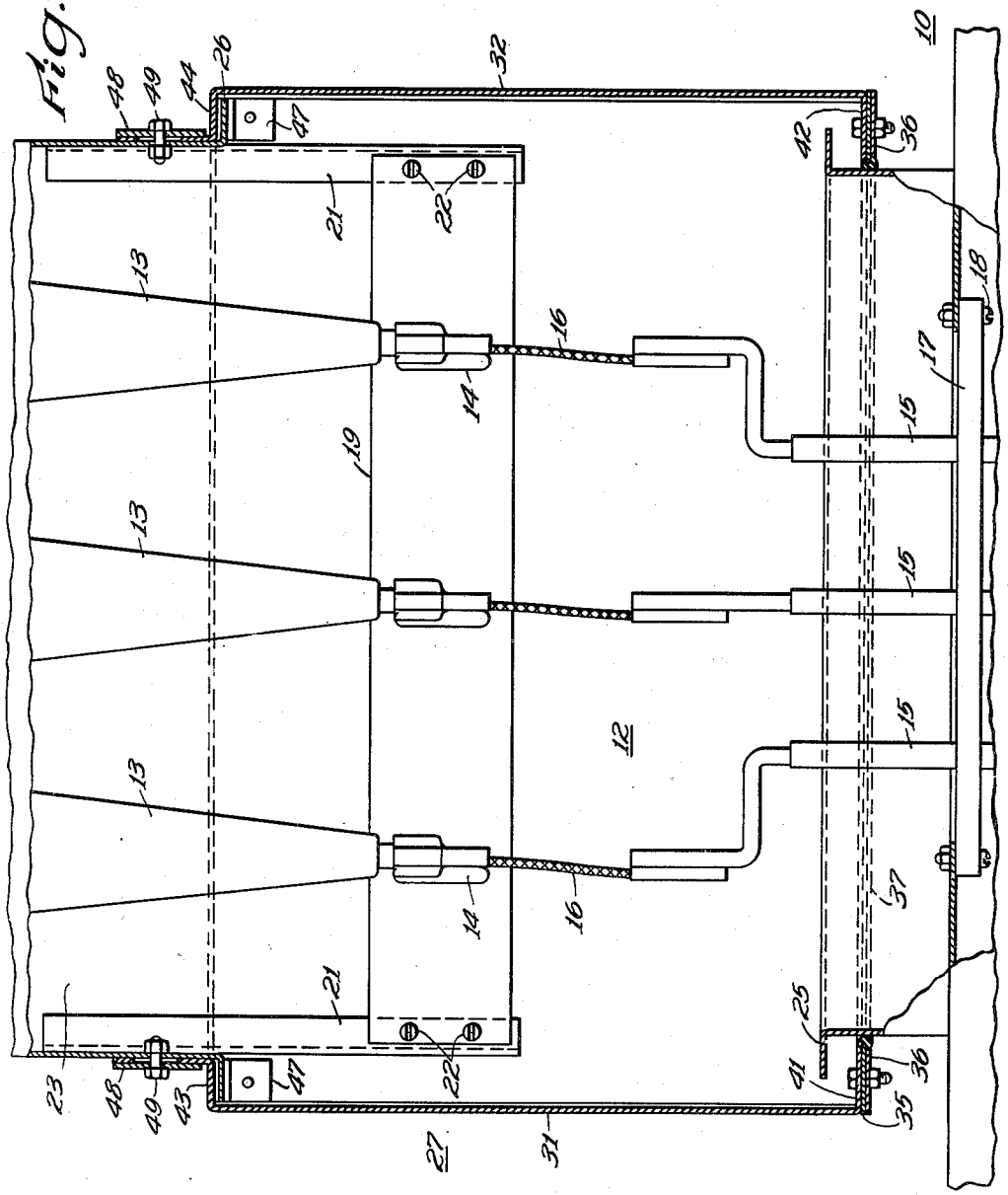

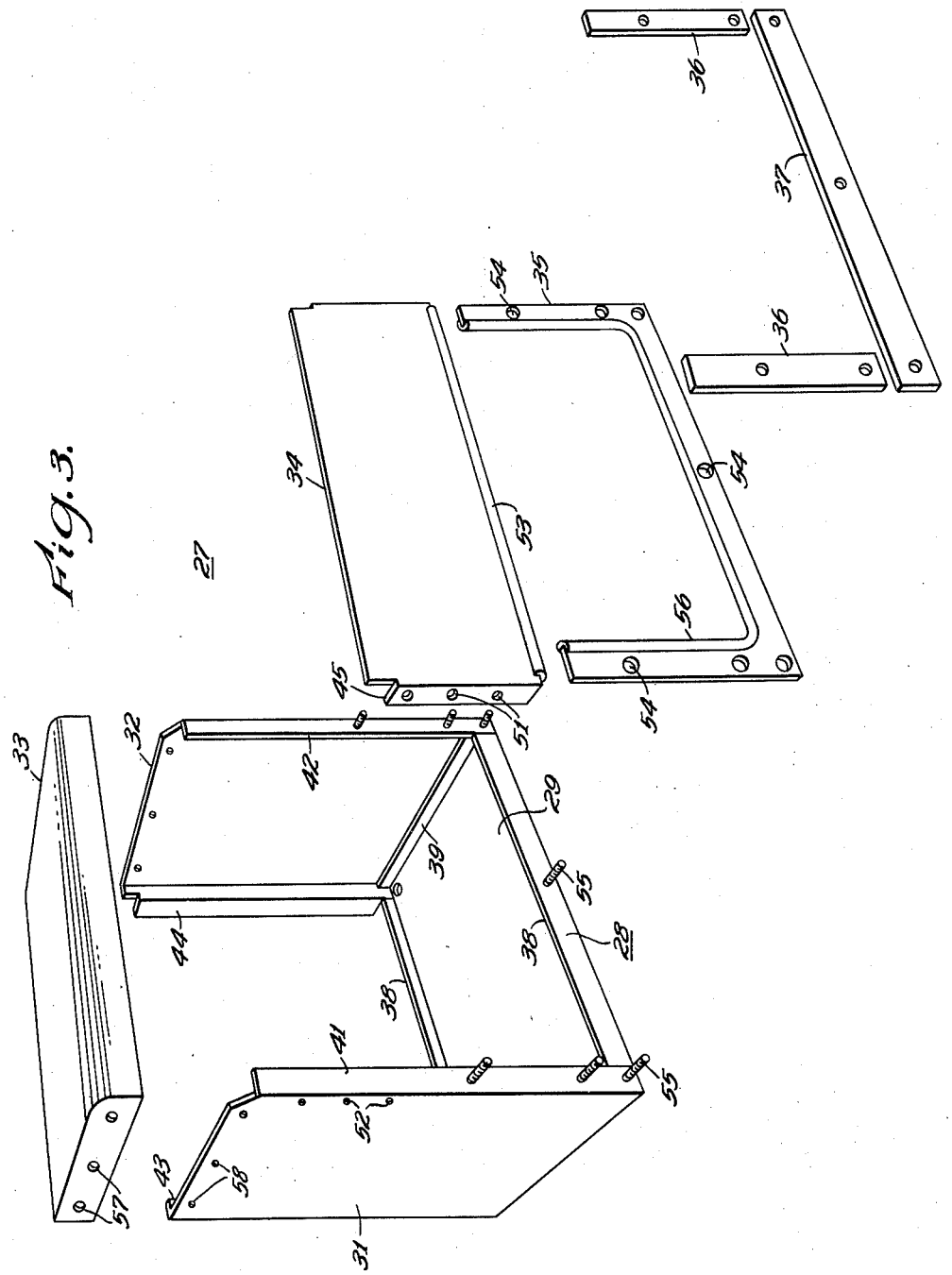

2,516,019

UNITED STATES PATENT OFFICE 2,516,019

PIPE JOINT

Paul R. Pierson and Glen L. Claybourn, Pittsburgh, Pa., assignors to Westinghouse Electric Corporation, East Pittsburgh, Pa., a corporation of Pennsylvania Application March 6, 1948, Serial No. 13,415

8 Claims. (Cl. 285—199)

Our invention relates, generally, to metal-enclosed switchgear and, more particularly, to metal-enclosed switchgear suitable for outdoor service.

An object of our invention, generally stated, is to provide a removable, weatherproof enclosure for the high voltage electrical connections between a power transformer or other electrical device and a metal-enclosed switchgear unit which shall be simple and efficient in operation and which may be economically manufactured and installed.

A more specific object of our invention is to provide a removable, weatherproof, throat connection enclosure which requires a minimum amount of coordination between the switchgear manufacturing and the transformer or other electrical device manufacturing.

Another object of our invention is to eliminate resonance and sounding board effect between a transformer unit and a switchgear unit which are joined by a metal throat connection enclosure.

A further object of our invention is to provide an electrical connection enclosure which affords the maximum amount of accessibility for making and inspecting the electrical connections.

Still another object of our invention is to provide a throat connection enclosure which may be readily assembled in the field.

Other objects of our invention will be explained fully hereinafter or will be apparent to those skilled in the art.

In accordance with one embodiment of our invention the electrical connections between a transformer unit and a metal-clad switchgear unit are enclosed by a metal throat connection which is entirely supported by the transformer unit. The throat connection is so constructed that it may be assembled in the field without special tools. Variations in the location of the throats on the connected units are compensated for by floating members of the throat connection enclosure.

For a better understanding of the nature and objects of our invention, reference may be had to the following detailed description, taken in conjunction with the accompanying drawings, in which:

Figure 1 is a view, partially in side elevation and partially in section, of a portion of a transformer unit and a portion of a metal-enclosed switchgear unit which are electrically connected, the electrical connections being enclosed by a removable throat connection embodying the principal features of our invention.

Fig. 2 is a view, partially in plan and partially in section, of the structure shown in Fig. 1, and Fig. 3 is an exploded view, in perspective, of the throat enclosure.

Referring to the drawings, and particularly to Figure 1, the structure shown therein comprises a metal-enclosed switchgear unit 10, only a portion of which is shown, and a transformer unit or other electrical device 11, only a portion of which is shown. The device 11 is connected to the unit 10 by electrical connections 12 comprising condenser bushings 13, vertically disposed copper conductors 14, horizontally disposed copper conductors 15 and flexible conductors 16 which connect the lower ends of the vertical conductors 14 to the outer ends of the horizontal conductors 15.

The horizontal conductors 15 may be supported by an insulating member 17 which may be attached to one side of the housing for the unit 10 by bolts 18, as shown in Fig. 2. The vertical conductors 14 may be supported by an insulating member 19 which is attached to angle bar supports 21 by bolts 22. The angle bars 21 may be welded to the sides of a horizontally extending throat 23 provided on one side of the housing for the transformer unit 11.

The opening in the switchgear unit 10 for the conductors 15 is surrounded by a horizontally extending throat 24. As shown, the outer end of the throat 24 is provided with a flange 25. Likewise, the outer end of the throat 23 is provided with a flange 26.

In order to protect the electrical connections from accidental contact and from exposure to the weather, an enclosure 27 is utilized which may be readily installed in the field after the switchgear unit 10 and the transformer unit 11 are located in their proper positions for operation. As shown most clearly in Fig. 3, the enclosure 27 comprises a U-shaped base 28 having a bottom 29 and two ends 31 and 32, a hood 33, a cover plate 34, a U-shaped spacing member 35 and clamping strips 36 and 37.

The bottom 29 is provided with upwardly turned flanges 38 and 39 at the sides and the ends thereof, respectively. The ends 31 and 32 are provided with inwardly turned flanges 41 and 42, respectively, at the front thereof and with inwardly and rearwardly extending flanges 43 and 44, respectively, at the rear thereof. The cover plate 34 is provided with a rearwardly extending flange 45 on each of its ends.

After the electrical connections between the two units have been installed, the enclosure 27 may be assembled by lifting the U-shaped base 28 into position with the rear flange 38 of the bottom 29 overlapping the bottom flange 26 on the throat 23 of the transformer unit. The base 28 may be held in position by bolts 46 which are threaded into angle brackets 47 secured to the lower flange 26 of the transformer throat 23. The rearwardly extending flanges 43 and 44 of the ends 31 and 32, respectively, may also be clamped to the sides of the transformer throat 23 by clamping strips 48 and bolts 49, as shown most clearly in Fig. 2. In this manner, the throat enclosure is entirely supported by the transformer unit.

The cover plate 34 may then be installed to enclose the space between the top of the throat 24 and the top of the base 28, as shown in Fig. 1. The flanges 45 of the cover plate 34 are provided with enlarged openings 51 through which self-tapping screws (not shown) may be inserted into corresponding openings 52 in the ends of the base 28. Since the diameter of the openings 51 is considerably larger than the diameter of the self-tapping screws, the cover plate 34 may be so adjusted that a rubber gasket 53 on the lower edge of the cover plate 34 engages the top wall of the throat 24. As shown in Fig. 1 the cover plate 34 overlaps the flange 25 on the throat 24.

As shown in Fig. 3, the U-shaped spacing member 35 is provided with enlarged openings 54 for stud bolts 55 provided in the base 28. Thus, the spacing member 35 may be so adjusted that a rubber gasket 56 on the inner edge of the spacing member engages the bottom and side walls of the throat 24. When the spacing member is properly adjusted, it may be held in position by the clamping strips 36 and 37 which are secured on the stud bolts 55. It will be noted that the spacing member 35 overlaps the flange 25 on the throat 24.

The hood 33 may then be placed on top of the base 28 and secured in position by self-tapping screws which pass through enlarged openings 57 into corresponding openings 58 in the ends of the base 28. The hood overlaps the ends of the base, the flange 26 on the transformer throat and the top of the cover plate 34. In this manner, a completely weatherproof enclosure is provided since overlapping joints are provided between the various parts of the enclosure.

Furthermore, resonance and sounding board effect is eliminated since there is no direct metallic contact between the switchgear unit housing 10 and the transformer unit housing 11. The rubber gaskets 53 and 56 prevent metallic contact between the parts of the enclosure and the throat 24 on the switchgear unit housing. The flexible conductors 16 eliminate resonance and sounding board effect between the copper conductors and also permits expansion of the conductors.

It will be seen that variations in the space between the units 10 and 11 and in the location of the throat members on the units may be compensated for by adjusting the cover plate 34 and the spacing member 35 when it is installed in position below the cover plate 34. Thus, close coordination between the switchgear manufacturing and the transformer manufacturing is not required. Since the enclosure may be assembled after the electrical connections are completed, the installing of the electrical connections is greatly facilitated as they are completely accessible while being installed.

After the enclosure is assembled, the removal of the hood 33 will permit complete inspection of the electrical connections without it being necessary to remove the complete enclosure. Removal of the hood and the cover plate 34 provides complete accessibility for maintenance of the electrical connections or for making major changes in the connections. The complete throat enclosure may be removed by loosening the holding bolts and clamping strips and lowering the assembly to the ground.

From the foregoing description, it is apparent that we have provided a removable, weatherproof enclosure for the electrical connections between two apparatus units which are disposed in spaced relation. The present enclosure may be readily installed after the electrical connections are completed without requiring the use of special tools.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. An enclosure for electrical connections between two apparatus units at least one of which has a projecting throat thereon, said enclosure comprising a U-shaped base having a bottom and two ends, a removable hood for the base, a cover plate extending between said ends and adjustably attached thereto to slidably engage one side of said throat, and a U-shaped member adjustably attached to said ends to slidably engage the other sides of said throat.

2. An enclosure for electrical connections between two apparatus units at least one of which has a projecting throat thereon, said enclosure comprising a U-shaped base having a bottom and two ends, a removable hood for the base, a cover plate extending between said ends and adjustably attached thereto to slidably engage one side of said throat, and a U-shaped member adjustably attached to said ends below said cover plate and disposed to slidably engage the other sides of said throat.

3. An enclosure for electrical connections between two apparatus units at least one of which has a rectangular projecting throat thereon, said enclosure comprising a U-shaped base having a bottom and two ends, a removable hood for the base, a cover plate extending between said ends at one side of the base and adjustably attached thereto to slidably engage one side of said throat, and a U-shaped member adjustably attached to said ends below said plate and disposed to slidably engage the other three sides of said throat.

4. An enclosure for electrical connections between two apparatus units comprising, a U-shaped base having a bottom and two ends, means for attaching one side of said base to one of said units, a removable hood for the base, a cover plate adjustably attached to said ends and partially enclosing the side of the base opposite the side attached to one of said units, and a U-shaped member adjustably attached to said ends to slidably engage the other of said units.

5. An enclosure for electrical connections between two apparatus units comprising, a U-shaped base having a bottom and two ends, means for attaching one side of said base to one of said units, a removable hood for the base, a cover plate adjustably attached to said ends and partially enclosing the side of the base opposite the side attached to one of said units, and a U-shaped member adjustably attached to said ends in the space below said cover plate and disposed to slidably engage the other of said units.

6. An enclosure for connecting horizontally extending throats on two spaced apparatus units comprising, a U-shaped base having a bottom and two ends, means for attaching one side of said base to the throat on one of said units, a removable hood for the base, a cover plate adjustably attached to said ends and enclosing the space between said hood and the throat on the other of said units, and a U-shaped member adjustably attached to said base to slidably engage said throat.

7. An enclosure for connecting horizontally extending throats on two spaced apparatus units comprising, a U-shaped base having a bottom and two ends, means for attaching one side of said base to the throat on one of said units, a removable hood for the base, a cover plate adjustably attached to said ends to slidably engage one side of the throat on the other of said units, and a U-shaped member adjustably attached to said base to slidably engage the other three sides of said throat.

8. An enclosure for connecting horizontally extending throats on two spaced apparatus units comprising, a U-shaped base having a bottom and two ends, means for attaching one side of said base to the throat on one of said units, a removable hood for the base, a cover plate adjustably attached to said ends to slidably engage one side of the throat on the other of said units, a U-shaped member adjustably attached to said base to slidably engage the other three sides of said throat, and resilient means disposed between said throat and said cover plate and said U-shaped member.

PAUL R. PIERSON.
GLEN L. CLAYBOURN.

REFERENCES CITED

The following references are of record in the file of this patent:

UNITED STATES PATENTS

| Number | Name | Date |
|---|---|---|
| 1,660,093 | Sachs | Feb. 21, 1928 |
| 1,667,871 | Sachs | May 1, 1928 |
| 1,770,212 | Lewis | July 8, 1930 |

OTHER REFERENCES

Plant Distribution Systems and Associated Equipment, Sept. 1941 (Copy in Div. 48).